(12) United States Patent
Rometty et al.

(10) Patent No.: US 6,732,638 B1
(45) Date of Patent: May 11, 2004

(54) TIME-OUT INDICATOR FOR PNEUMATIC STRAPPER

(75) Inventors: John A. Rometty, Barrington, IL (US); Jason R. Nasiatka, Northbrook, IL (US); Robert J. Nix, Algonquin, IL (US)

(73) Assignee: Illinois Tool Works, Inc., Glenview, IL (US)

( * ) Notice: Subject to any disclaimer, the term of this patent is extended or adjusted under 35 U.S.C. 154(b) by 0 days.

(21) Appl. No.: 10/342,831

(22) Filed: Jan. 15, 2003

(51) Int. Cl.[7] .......................... B65B 13/32; B32B 35/00
(52) U.S. Cl. ...................... 100/33 R; 100/99; 156/358; 156/378; 156/502; 53/507
(58) Field of Search .......................... 100/33 R, 33 PB, 100/99, 29, 30; 53/52, 507, 508, 582; 156/358, 78, 494, 502, 580; 140/93.4, 152

(56) References Cited

U.S. PATENT DOCUMENTS

| | | |
|---|---|---|
| 3,654,033 A | 4/1972 | Angarola et al. |
| 4,243,077 A * | 1/1981 | Sansum ..................... 140/93.4 |
| 4,313,779 A | 2/1982 | Nix |
| 5,380,393 A | 1/1995 | Drabarek et al. |
| 5,954,899 A | 9/1999 | Figiel et al. |
| 6,079,456 A | 6/2000 | Drabarek et al. |
| 6,338,375 B1 | 1/2002 | Harada |

FOREIGN PATENT DOCUMENTS

| | | |
|---|---|---|
| EP | 0 593 261 B1 | 12/1996 |
| EP | 0 947 426 A1 | 10/1999 |
| EP | 1 008 520 A1 | 6/2000 |

* cited by examiner

Primary Examiner—Allen Ostrager
Assistant Examiner—Jimmy Nguyen
(74) Attorney, Agent, or Firm—Mark W. Croll, Esq.; Donald J. Breh, Esq.; Welsh & Katz, Ltd.

(57) ABSTRACT

A time-out indicator is adapted for use in a pneumatic strapping tool for tensioning a strap around a load, adhering the strap onto itself, and cutting a feed end of the strap. The strapping tool has a cylinder housing, a piston disposed within a cylinder in the cylinder housing, a pneumatic weld motor operably connected to the piston, a vibrating weld element operably connected to the piston for contacting the strap and adhering the strap onto itself. A pneumatic module is mounted to the cylinder housing to provide compressed gas to the cylinder housing and the pneumatic weld motor. The time-out indicator includes a sleeve fitted into an opening in the module. The opening is disposed above and in communication with the cylinder. The sleeve defines a central, longitudinal opening. An indicator is biasedly mounted in the sleeve and disposed for contact with the piston. The indicator reciprocates between a retracted position and an extended position and indicates a cycle of the strapping tool as an in-cycle state in which the cylinder is under pressure, pressurizing the piston to urge the weld element into contact with the strap and a timed-out state in which the piston is not pressurized.

20 Claims, 3 Drawing Sheets

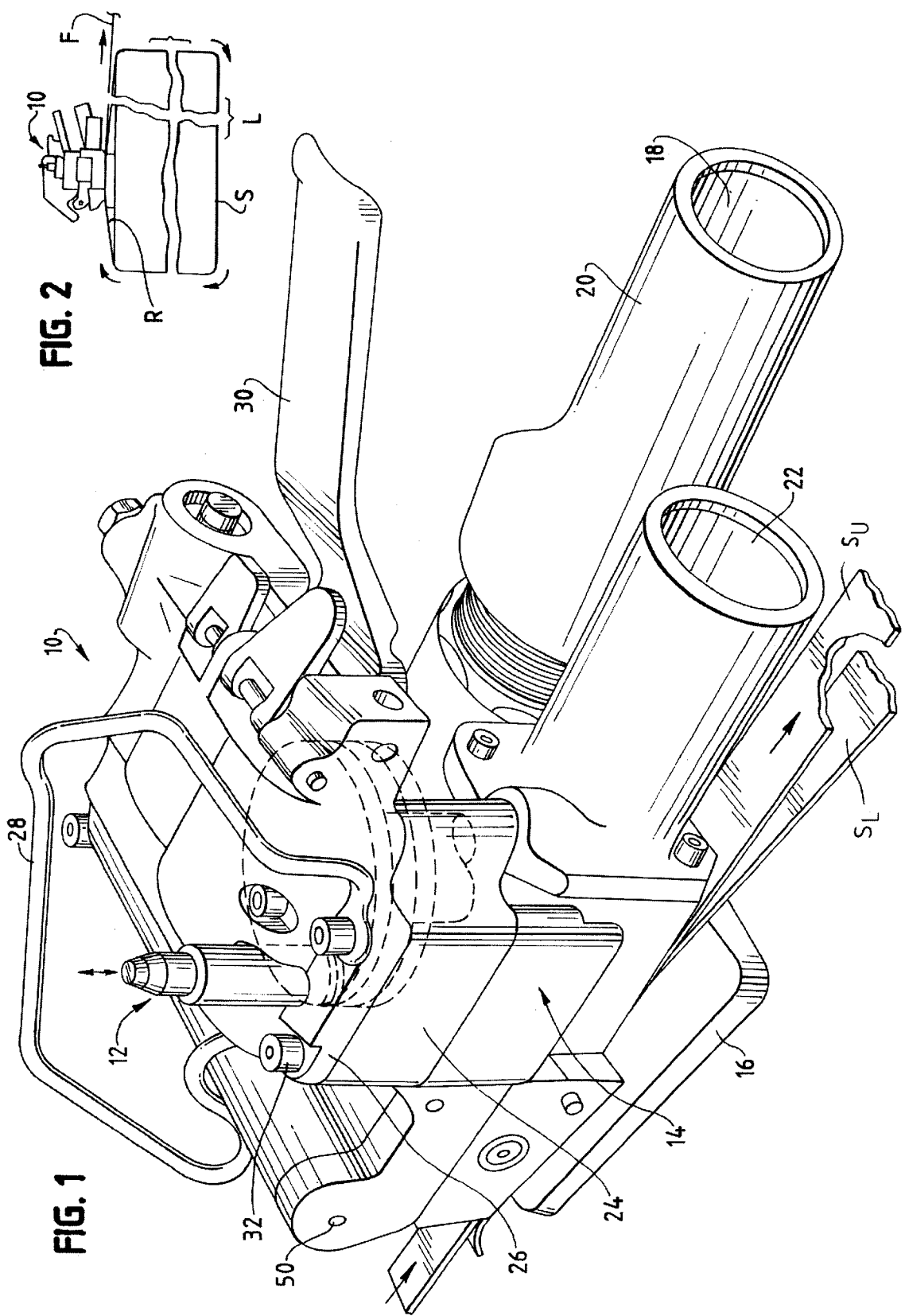

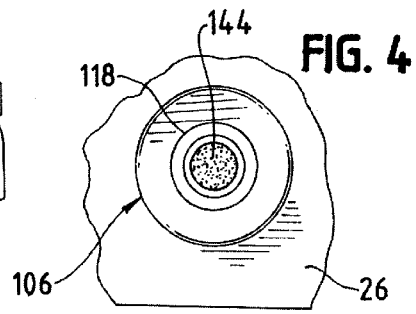
FIG. 3
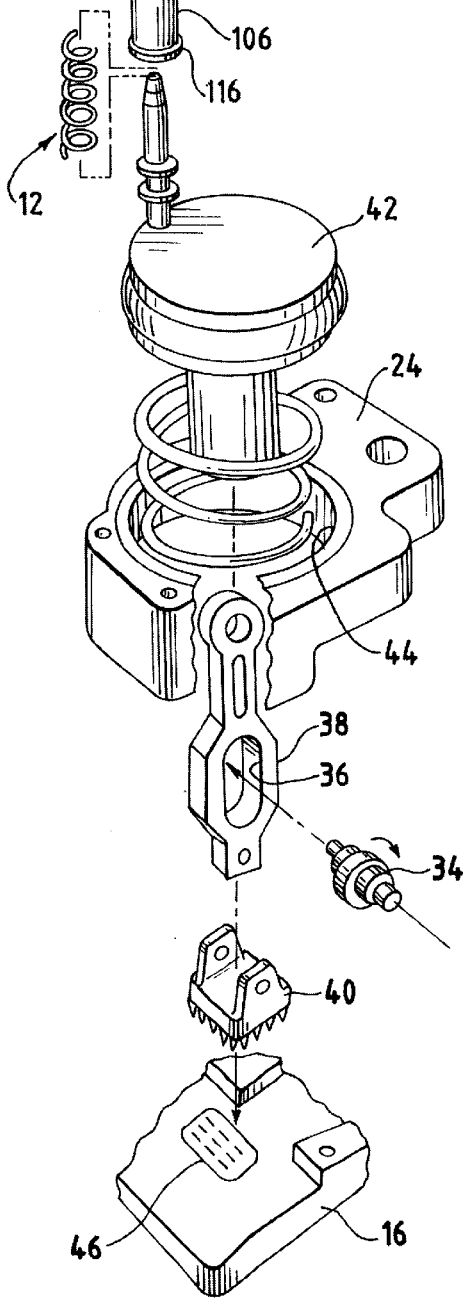
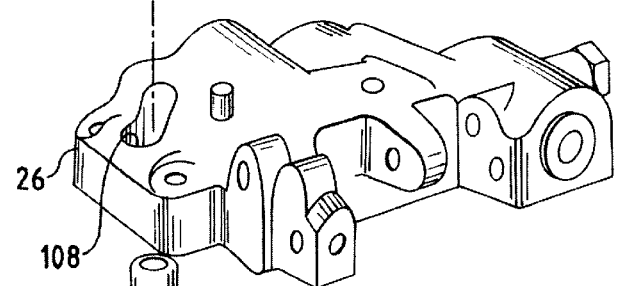
FIG. 4
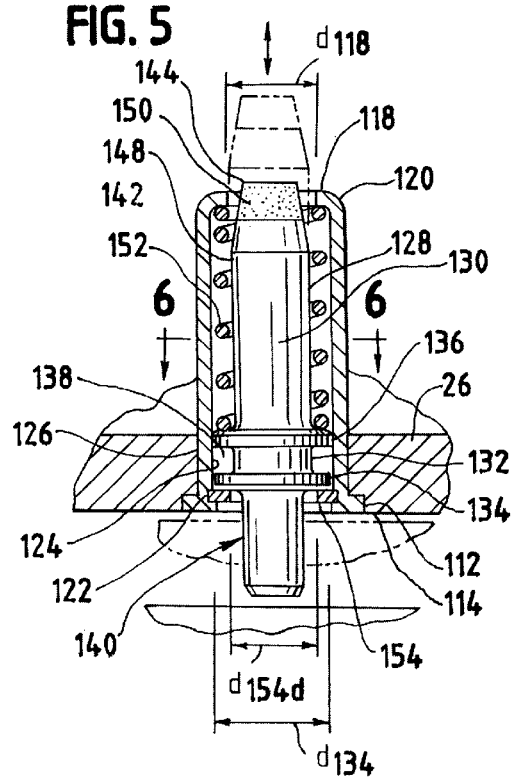
FIG. 5
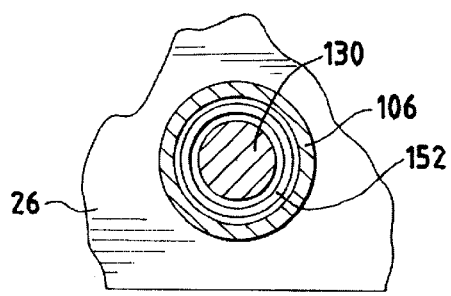
FIG. 6

TIME-OUT INDICATOR FOR PNEUMATIC STRAPPER

BACKGROUND OF THE INVENTION

The present invention pertains to an improved tool for tightening a strap around an object or load and adhering the strap onto itself. More particularly, the present invention is directed to a time-out indicator for a pneumatic motor tool for tensioning a strap around a load and welding or melt-adhering the strap onto itself.

Strapping tools are well-known in the art. These tools come in a wide variety of types, from fully manual tools to automatic, table-top tools. These tools are generally specifically designed for use with metal strapping or plastic/polymeric type strapping.

One well known type of strapping tool is a hand-held tool, that can be carried to and from a job-site. When such a tool is configured for use with plastic or polymeric strapping, a pneumatic system is used to vibrate contacting interfacial surfaces of overlapping plastic strap portions. The tool includes a clamping member for anchoring a strap free end portion, and a rotatable feed wheel cooperating with an anvil foot to engage a feed strap portion that is tensioned about the load. A clutch engagably couples the feed wheel to a pneumatic motor which also vibrates a jaw that welds the overlapping strap portions.

An exemplary tool, disclosed in U.S. Pat. No. 5,380,393 to Drabarek et al., also assigned commonly herewith and incorporated herein by reference, discloses a strapping tool having a pneumatic circuit for automatically controlling tool operation, including the timing and duration of strap welding and the cool down period. A pneumatically actuated ram extended after strap tensioning pivots a cam that moves a vibrating weld plate into contact with overlapping strap portions to form the weld. Vibration of the weld plate terminates after a time period controlled by the accumulation of air in a chamber. Air is subsequently bled from a cylinder that counter-pivots the ram to move the welding plate away from the welded strap portions after the cool down period.

As will be recognized by those skilled in the art, known pneumatic strapping tools require many system components that increase the size and weight of the tool. In addition, even though the pneumatic circuit of the above-mentioned U.S. Pat. No. 5,380,393 automates many strapping operations otherwise performed manually, controlling timing of the various tool operations as relatively and precise, and as a result inconsistent strap tension and welds may result.

An improved pneumatic strapping tool is disclosed in pending U.S. patent application Ser. No. 10/171,890, filed Jun. 14, 2002, entitled Dual Motor Strapper, which application is commonly assigned herewith, and the disclosure of which is incorporated herein by reference. In this improved tool, two unidirectional pneumatic motors, one motor for tensioning or feeding strap and another, separate motor for welding the strap material onto itself are provided. To provide flexibility as to operation and maintenance, a self contained modular pneumatic member or module includes pneumatically controlled timing circuits and is readily installed onto and removed from the body and motor portions of the tool.

In this tool, one timing circuit provides for properly timing the "welding" of the strap onto itself. That is, the timing circuit controls the time that the vibrating weld plate is maintained in contact with the overlapping strap portions to form the weld. The timing circuit works, in part, by accumulation of air in a chamber that halts vibration of the weld plate after a predetermined period of time. However, there is currently no indication of the changing state of the circuit. That is, there is no direct indication that the timing circuit has run its course.

Accordingly, there exists a needed for a timing indicator for the pneumatic circuit of a pneumatic strapping tool. Desirably, such an indicator is directly actuated by, e.g., operably connected to, the pneumatic circuit. More desirably, such an indicator provides readily visible indication of the state of the circuit and the weld cycle.

BRIEF SUMMARY OF THE INVENTION

A time-out indicator is configured for use in a pneumatic strapping tool. The toll tensions a strap around a load, adheres the strap onto itself, and cuts a feed end of the strap. The tool has a cylinder housing, a piston disposed within a cylinder in the cylinder housing, a pneumatic weld motor operably connected to the piston, a vibrating weld element operably connected to the piston for contacting the strap and adhering the strap onto itself, and a pneumatic module mounted to the cylinder housing.

The pneumatic module includes a compressed gas inlet, a plurality of valves and passageways between the inlet and the valves to provide compressed gas to the cylinder housing and the pneumatic weld motor. The module further includes at least one timer for operation of the weld motor and for providing pressure to the cylinder. The module further controls timing of the weld motor.

The time-out indicator includes a sleeve fitted into an opening in the module that is disposed above and in communication with the cylinder. The sleeve defines a central, longitudinal opening.

An indicator is biasedly mounted in the sleeve and is disposed for contact with the piston. The indicator reciprocates between a retracted position and an extended position. The indicator indicates a cycle of the strapping tool as an in-cycle state in which the cylinder is under pressure, pressurizing the piston to urge the weld element into contact with the strap and a timed-out state in which the piston is not pressurized.

Preferably, the indicator is in the retracted position when the strapper is in the in-cycle state and is in the extended position, by contact of the piston with the indicator, when the strapper is in the timed-out state.

A seal element is disposed along the stem for preventing the introduction or loss of compressed gas from the pneumatic module. In a current embodiment, the seal is positioned in a seal channel that is defined by a pair of spaced ring walls extending outwardly from the stem.

The sleeve can include an inwardly projecting lip at an upper end thereof. In this configuration, the stem includes an outwardly projecting wall adapted to contact the wall to retain the indicator within the sleeve. The outwardly projecting wall can be one of the ring walls.

A biasing element can be disposed in the sleeve for biasing the indicator to the retracted position. A retaining element is disposed to retain the biasing element in the sleeve. The retaining element can be a spring retaining clip that is received in a grooved formed in an inner wall of the sleeve.

A strapping tool can have the time-out indicator mounted in a pneumatic module for the tool.

These and other features and advantages of the present invention will be apparent from the following detailed description, in conjunction with the appended claims.

BRIEF DESCRIPTION OF THE SEVERAL VIEWS OF THE DRAWINGS

The benefits and advantages of the present invention will become more readily apparent to those of ordinary skill in the relevant art after reviewing the following detailed description and accompanying drawings, wherein:

FIG. 1 is a perspective view of a pneumatic strapper having a time-out indicator embodying the principles of the present invention, the tool being shown with a strap material positioned in the tool, and showing the direction of movement of the material;

FIG. 2 illustrates the tool positioned relative to a load being strapped and the direction of movement of the strap material during tensioning;

FIG. 3 is a partial exploded view of the pneumatic module showing the time-out indicator and position of the indicator relative to the weld piston cylinder and the weld piston;

FIG. 4 is a top view of the indicator;

FIG. 5 is a partial cross-sectional view of the indicator as positioned in the pneumatic module, and showing the indicator in the cycle timed-out position;

FIG. 6 is cross-sectional view taken along line 6—6 of FIG. 5; and

DETAILED DESCRIPTION OF THE INVENTION

Figure 7:
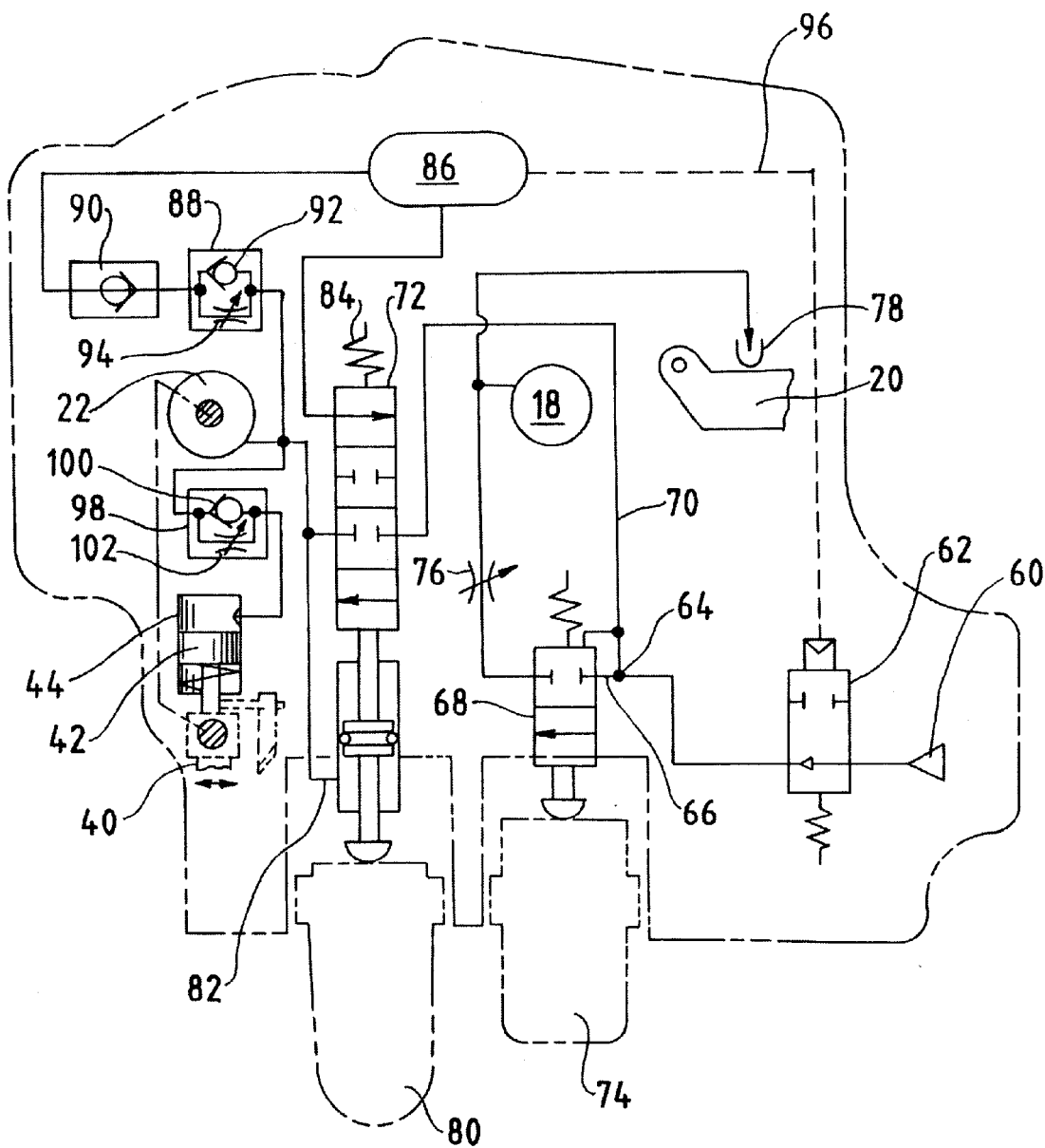
FIG. 7 is a pneumatic circuit for the exemplary strapping tool.

While the present invention is susceptible of embodiment in various forms, there is shown in the drawings and will hereinafter be described a presently preferred embodiment with the understanding that the present disclosure is to be considered an exemplification of the invention and is not intended to limit the invention to the specific embodiment illustrated.

It should be further understood that the title of this section of this specification, namely, "Detailed Description Of The Invention", relates to a requirement of the United States Patent Office, and does not imply, nor should be inferred to limit the subject matter disclosed herein.

Referring now to the figures and in particular to FIGS. 1 and 2, there is shown a pneumatic strapper or strapping tool 10 having a time-out indicator assembly 12 embodying the principles of the present invention. The tool 10 is configured to tension a strap S around a load L, weld the strap material S onto itself and sever a feed end F of the strap S. For purposes of the present disclosure, the strap material S will be referred to as having a feed end F which is the supply end of the material and a free end R which is that end of the material that is fed around the load L and reinserted into the strapping tool 10.

The tool 10 includes, generally, a body 14, a foot 16, a tensioning motor 18 and housing 20, a weld motor 22, a cylinder housing 24 and a pneumatic module 26. The tool 10 can include a handle 28 and grip 30, such as those shown for ease of handling and use. The pneumatic module 26, as will be discussed in more detail below, is mounted to the cylinder housing 24 which is in turn mounted to the body 14 and provides pneumatic pathways between the module 26, the cylinder housing 24 and the tensioning and weld motors 18, 22 for introducing and venting a compressed gas, such as compressed air, for operation of the tool 10 and to and from the motors 18, 22. The module 26 is readily mounted to and removed from the housing 24 by a plurality of fasteners 32 such as bolts and the like.

Referring now to FIG. 1, in the exemplary tool 10, the weld motor 22 is mounted to the body 14 in stationary relation so that the weld motor 22 and body 14 are fixed relative to one another. A weld motor shaft (not shown) extending from the motor 22 engages an eccentric element 34. The eccentric element 34 is positioned in an elongated opening 36 in an arm 38 that is operably connected at one end to a weld element 40 and at an opposing end to a piston 42. The piston 42 is positioned in a cylinder 44 in the cylinder housing 24.

Upon actuation of the weld motor 22, the shaft rotates which in turn rotates the eccentric element 34. The eccentric 34 is fitted into the elongated opening 36 so that as the motor 22 rotates, it imparts vibrational movement to the weld element 40. The upper and lower strap layers $S_U$, $S_L$ are positioned between the weld element 40 and a stationary weld pad 46 on the foot. The vibrational movement is transferred into the strap layers $S_U$, $S_L$ and welds the strap onto itself. The operation and construction of such vibrational weld elements and the various arrangements to impart vibrational energy will be recognized and understood by those skilled in the art and are within the scope and spirit of the present invention.

To assure that sufficient pressure is exerted by the weld element 40, the piston 42 receives compressed gas (e.g., compressed air) at the top of the piston 42 in the cylinder 44 when the tool 10 is in the welding cycle. The gas forces the piston 42 downwardly to assure that the proper force is exerted on the strap S as the weld element 40 vibrates.

The foot 16 is likewise mounted to the body 14 so that foot 16 and body 14 are stationary relative to one another. The foot 16 has the weld pad 46 mounted thereto, against which the strap S is held for tensioning. As set forth above, the weld pad 45 is positioned on the foot 16 to maintain the lower section of the strap $S_L$ stationary as the upper section of strap $S_U$ is vibrated to effect the weld.

The tensioning motor 18 is mounted in fixed relation to the tensioning motor housing 20 which is in turn pivotally mounted to the body 14 by a pivot pin 48. The pin 48 permits the motor housing 20 to pivot relative to the body 14. A transmission (not shown) located within the housing 20 transfers the driving force from the motor 18 to a feed wheel shaft 50 on which a feed wheel (not shown) is mounted. As such, the feed wheel pivots along with the tensioning motor 18 and housing 20 relative to the body 14. A detailed discussion of the weld and tensioning motors, as well as their operation within the overall strapper is provided in the aforementioned U.S. patent application Ser. No. 10/171,890.

Referring now to FIGS. 1 and 3, the pneumatic module 26 is removable mounted to the cylinder housing 24. The module 26 includes a plurality of components (e.g., switches, valves, accumulators, shown schematically in FIG. 7) to control the overall operation of the strapper 10. The module 26 is configured to readily mount to and be removed from the housing 24 by, for example, the exemplary bolts 32. In this manner, in the event that maintenance is required on the pneumatic module 26, the module 26 can be removed and a replacement module can be readily installed on the tool 10 for continued use.

Referring to FIG. 7, a pneumatic schematic is shown. Air enters the tool 10 through a compressed air supply 60 and enters a pilot valve 62. The pilot valve 62 is a two position valve (on-off) that is biased to the on position (as shown). The on position routes air to a juncture 64 at which the air supply splits with one branch 66 routing air to a tension motor valve 68 and the other branch 70 routing air to a weld cycle valve 72.

Depressing or actuating a tensioning motor switch 74 moves the tensioning motor valve 68 into the open position, routing air through a variable orifice 76 to the tensioning motor 18 and routing air to a tensioning piston 78. The variable orifice 76 is adjustable to provide control of the tensioning motor 18 power output. (Note that the tensioning motor valve 68 is shown in the off or closed position.) The piston 78 extends downwardly from the cylinder housing 24 and applies a force against the tensioning motor housing 20 when the tensioning motor 18 is actuated. The piston 78 assists maintaining the tool 10 in the engaged position. A spring (not shown) is positioned above the piston 78 to bias the piston 78 downwardly against the motor housing 20. Releasing the tensioning motor switch 74 closes the tensioning motor valve 68, terminating the air feed to the tensioning motor 18 and to the piston 78.

As set forth above, depressing the tensioning motor switch 74 actuates the tensioning motor 18 to tension the strap S. When a predetermined tension is reached, the motor 18 stalls. Releasing the switch 74 merely stops the feed of air to the motor 18. The tensioning arrangement is such that the strap S will not "slip" back, nor will the strapper 10 rotate rearwardly to loosen the strap S.

A weld cycle switch 80 operates the weld cycle valve 72. Depressing the switch 80 moves the valve 72 to the on position. (Note that the valve 72 is shown in the off or closed position.) The weld cycle valve 72 is a contact or maintain valve. In the on position, air is routed through the second line 70 branch to the valve 72. Air enters the valve 72 and is routed to the weld motor 22. A tee line 82 from the weld motor line is routed back to the weld cycle valve 72 to "hold" the valve 72 in the on position. The valve 72 is spring 84 biased to the closed position, however, the air pressure "holding" the valve 72 open is sufficiently high to overcome the spring 84 force.

At the same time that air is routed to the weld motor 22, air is directed to a volume chamber or accumulator 86, through a weld timer 88 and check valve 90 for weld timing. The weld timer 88 is a check valve 92 in parallel with a restriction device 94 such as the illustrated orifice. In this manner, air flow into the accumulator 86 is restricted (and thus timed) in that flow through the orifice 94 is limited or restricted. A line 96 from the accumulator 86 is routed to the pilot valve 62, so that as the pressure in the accumulator 86 increases, air flows to the back side of pilot valve 62. When the air in the accumulator 86 reaches a predetermined pressure, the pilot valve 62 closes, thus stopping air flow to the weld cycle valve 72. This stops operation of the weld motor 22.

When air flow is terminated to the weld cycle valve 72, the pressure exerted to maintain the valve 72 open (through line 82) also drops, and the valve 72 returns to the closed position by action of the spring bias 84.

Returning to the weld cycle, as air is provided to the weld motor 22, air is also routed to the weld cylinder 4 (to the top of the piston 42) to maintain pressure on the piston 42 (which assures that sufficient pressure is applied by the weld element 40 on the strap S). The air is routed to the top of the cylinder 44 through a cool down timer 98. As set forth above, after welding is complete, the strap S must be allowed sufficient time to cool to assure the integrity of the weld. Cool down is accomplish with pressure applied by the weld element 40 on the strap S (pressure on the piston 42), without vibrational motion of the element 40 being imparted.

The cool down timer 98 maintains pressure on the piston 42 without vibrational motion of the weld element 40. When the air to the weld motor 22 is stopped, the weld element 40 ceases to vibrate. The air routed to the top of the weld 44 cylinder is slowly vented from the cylinder 44 by a restricted vent path from the top of the cylinder 44. The cool down timer 98 is configured similar to the weld timer 88 and includes a check valve 100 in parallel with a restriction device 102 such as an orifice. In this manner, although the weld motor 22 has stopped, the pressure exerted by the (piston 42 and the) weld element 40 is maintained and is slowly released by timed venting from the cylinder 44.

The time-out indicator assembly 12 is positioned on the pneumatic module 26. The indicator assembly 12 is of the pop-up type and provides indication of the end of the cool down cycle following the weld cycle. The assembly 12 includes an indicator sleeve 106 that is mounted in an opening 108 in the pneumatic module 26. The opening 108 opens into the weld piston cylinder 44, above the piston 42.

The sleeve 106 is fitted into the pneumatic module 26, preferably by press-fitting. In a current embodiment, a groove 112 is formed in the inside surface 114 of the module 26 and the sleeve 106 has an outwardly extending flange 116 that fits into the groove 112. An outside diameter of the sleeve 106 is slightly larger at the region that engages the inside wall of the opening 108 to assure a tight fit between the sleeve 106 and the module 26. In this manner, the connection between the sleeve 106 and the module 26 is sufficiently tight to prevent the escape of compressed gas (air) from the cylinder 44 during operation of the strapper 10. Because the sleeve 106 is fixed in the module 26 and does not move, the seal between the sleeve 106 and the module 26 is readily accomplished. The sleeve 106 further includes an inwardly turned lip 118 (defining an inner diameter $d_{118}$) at an upper end 120 and a groove 122 formed in an inner wall 124 of the sleeve 106 at a lower end 126, adjacent the flange 116.

An indicator 128 resides in the sleeve 106 and is configured for reciprocating (e.g., up and down) movement within the sleeve 106 between an "incycle" position and a "cycle timed-out" position. In the in-cycle position, the weld and cool down time has not yet elapsed and the strap S is not fully ready, that is not welded or fully cooled.

The indicator 128 includes a body or stem 130 having a relatively cylindrical profile that is divided by a ring channel 132. The ring channel 132 is defined by inner and outer circumferentially outwardly extending ring walls 134, 136, respectively, spaced from one another to define the channel 132. As will be discussed below, the channel 132 is configured to receive a sealing element 138. For purpose of the present disclosure, inner refers to that side of the sealing element, indicated generally at 140, that is within the pressure boundary of the pneumatic module 26, and conversely, outer refers to that side of the sealing element, indicated generally at 142, that is outside of (i.e., the environs side of) the seal 138.

The portion 142 of the indicator 128 above the outer ring wall 136 (i.e., on the environs side of the seal 138) has a slightly larger diameter than the portion 140 below the inner ring wall 134 (i.e., within the pressurized cylinder 44 region). At the far or free end of the environs side of the indicator body 130 (referred to as the indicating end), a head portion 144 tapers to a flat surface 146.

In a current embodiment, an intermediate portion, as indicated generally at 148, of the stem 130 and a portion of the tapered head 144, such as by painting, with a readily visibly identifiable coating. This provides positive indication of the cycle timed out-state. A present indicator includes paint, preferably a bright, readily visible color, such as a white color, from about the outer ring channel 136 to about the mid-point of the indicating end head 144. From the colored portion to the end of the head 144 (as indicated generally at 150), the indicator 128 is colored (painted) a dark color, such as black, preferably matching the color of the pneumatic module 26. In this manner, when the strapper 10 is in the in-cycle mode and the indicator is retracted, no "color" is visible. When, on the other hand, the weld and cooling cycles have completed, and the strapper 10 is in the cycle timed-out mode, the indicator extends (or pops) and the color of the body or stem of the indicator 128 is readily visible.

During in-cycle mode, and when the strapper 10 is not in operation, it is preferred that the indicator 128 reside in the in-cycle position (i.e., retracted position) to prevent damage to the indicator 128. To this end, the indicator 128 is biased to the in-cycle or retracted position. This is accomplished by a biasing element 152, such as the illustrated coil spring that is positioned around the indicator stem 130 between the outer ring wall 136 and the sleeve lip 118. The spring 152 thus biases the indicator 128 inward of the sleeve 106, again to the retracted position. To retain the indicator 128 in the sleeve 106 and prevent it from inadvertently coming loose within the internal portions of the pneumatic module (e.g., falling into the cylinder 44), a clip 154, such as the illustrated spring clip is positioned in the sleeve groove 122. The clip 154 has an inner diameter $d_{154}$ that is less that the diameter $d_{134}$ of the inner ring wall 134. As such, the clip 154 retains the indicator 128 and the spring 152 within the sleeve 106, and thus maintains the indicator assembly 12 as a single, essentially integrated unit.

Because the bottom of the indicator 128 is positioned in the pressurized region of the strapper 10, that is, in the weld cylinder 44, and extends to an area external of the pneumatic module 26 (i.e., to the environs) it is necessary to provide a pressure barrier at the interface of the pressurized region and the environs. To this end, the sealing element 138 is provided between the indicator 128 and the sleeve 106. In a present indicator, the seal 138 is an O-ring that is positioned in the ring channel 132. As such, the seal 138 prevents the escape of compressed air from the pneumatic module 26, and the channel 132 retains the seal 138 in place.

As will be appreciated from a study of the figures, the present indicator assembly 12 functions on a simple, contact principle, and does not rely on the application or use of pneumatic pressure to provide cycle indication. Rather, as the piston 42 rises in the cylinder 44, it contacts the bottom portion of the indicator 128. The upward force exerted by the piston 42 urges the indicator 128 up (that is outward of the sleeve 106), so that the painted (indicating) portion 148 of the indicator 128 extends above the sleeve lip 118 and becomes visible, providing indication that the cycle timed-out state has been reached. Upon movement of the piston 42 downward, the spring 152 force returns the indicator 128 to the retracted position, indicating the in-cycle state.

All patents referred to herein, are hereby incorporated herein by reference, whether or not specifically do so within the text of this disclosure.

In the present disclosure, the words "a" or "an" are to be taken to include both the singular and the plural. Conversely, any reference to plural items shall, where appropriate, include the singular.

From the foregoing it will be observed that numerous modifications and variations can be effectuated without departing from the true spirit and scope of the novel concepts of the present invention. It is to be understood that no limitation with respect to the specific embodiments illustrated is intended or should be inferred. The disclosure is intended to cover by the appended claims all such modifications as fall within the scope of the claims.

What is claimed is:

1. A time-out indicator assembly for a pneumatic strapping tool for tensioning a strap around a load, adhering the strap onto itself, and cutting a feed end of the strap, the strapping tool having a cylinder housing, a piston disposed within a cylinder in the cylinder housing, a pneumatic weld motor operably connected to the piston, a vibrating weld element operably connected to the piston for contacting the strap and adhering the strap onto itself, and a pneumatic module mounted to the cylinder housing, the pneumatic module including a compressed gas inlet, a plurality of valves and passageways between the inlet and the valves to provide compressed gas to the cylinder housing and the pneumatic weld motor, the module further including at least one timer for operation of the weld motor and for providing pressure to the cylinder, the module configured for controlling timing of the weld motor, the time-out indicator assembly comprising:

a sleeve fitted into an opening in the module, the opening disposed above and in communication with the cylinder, the sleeve defining a central, longitudinal opening;

an indicator biasedly mounted in the sleeve and disposed for contact with the piston, the indicator including a stem, the indicator reciprocating between a retracted position and an extended position and indicating a cycle of the strapping tool as an in-cycle state in which the cylinder is under pressure, pressurizing the piston to urge the weld element into contact with the strap and a timed-out state in which the piston is not pressurized.

2. The time-out indicator assembly in accordance with claim 1 wherein the indicator is in the retracted position when the strapper is in the in-cycle state and is in the extended position, by contact of the piston with the indicator, when the strapper is in the timed-out state.

3. The time-out indicator assembly in accordance with claim 1 including a seal element disposed along the stem for preventing the introduction or loss of compressed gas from the pneumatic module.

4. The time-out indicator assembly in accordance with claim 3 wherein the seal is positioned in a seal channel.

5. The time-out indicator assembly in accordance with claim 4 including inner and outer spaced apart ring walls extending outwardly from the stem, wherein the seal channel is formed by the spaced ring walls.

6. The time-out indicator assembly in accordance with claim 1 wherein the sleeve includes an inwardly projecting lip at an upper end thereof and wherein the stem includes an outwardly projecting wall adapted to contact an inner of the inwardly projecting lip to retain the indicator within the sleeve.

7. The time-out indicator assembly in accordance with claim 6 wherein the outwardly projecting wall is formed as the outer ring wall.

8. The time-out indicator assembly in accordance with claim 7 including an outwardly projecting inner ring wall spaced from the outer ring wall, wherein a seal is disposed between the ring walls.

9. The time-out indicator assembly in accordance with claim 1 including a biasing element disposed in the sleeve for biasing the indicator to the retracted position.

10. The time-out indicator assembly in accordance with claim 9 including a retaining element disposed to retain the indicator in the sleeve by engaging the inner ring wall.

11. The time-out indicator assembly in accordance with claim 10 wherein the retaining element is received in a grooved formed in an inner wall of the sleeve.

12. A time-out indicator assembly for a pneumatic strapping tool for tensioning a strap around a load, adhering the strap onto itself, and cutting a feed end of the strap, the strapping tool having a cylinder housing, a piston disposed within a cylinder in the cylinder housing, a pneumatic weld motor operably connected to the piston, a vibrating weld element operably connected to the piston for contacting the strap and adhering the strap onto itself, and a pneumatic module mounted to the cylinder housing, the pneumatic module including a compressed gas inlet, a plurality of valves and passageways between the inlet and the valves to provide compressed gas to the cylinder housing and the pneumatic weld motor, the module further including at least one timer for operation of the weld motor and for providing pressure to the cylinder, the module configured to control timing of the weld motor, the time-out indicator assembly comprising:
- a sleeve fitted into an opening in the module above and in communication with the cylinder, the sleeve defining a central, longitudinal opening, the sleeve including an outwardly extending flange for fitting against an inside surface of the pneumatic module circumferentially around the module opening and a groove formed in an inner wall of the sleeve proximal the flange, the sleeve including an inwardly projecting lip at an end opposing the flange;
- an indicator biasedly mounted in the sleeve and disposed for contact with the piston, the indicator including a generally cylindrical stem having inner and outer outwardly extending, spaced apart ring walls and a seal disposed between the ring walls for isolating the cylinder housing, the outer ring wall having a diameter greater than a diameter of the inwardly projecting lip to retain the indicator within the sleeve;
- a biasing element positioned about the indicator seating on the outer ring wall for biasing the indicator to the retracted position; and
- a retaining clip disposed in the sleeve inner wall groove for engaging the inner ring wall to retain the indicator in the sleeve,
- wherein the indicator reciprocates between a retracted position and an extended position and, in the retracted position indicates a cycle of the strapping tool as an in-cycle state in which the cylinder is under pressure, pressurizing the piston to urge the weld element into contact with the strap and in the extended position indicates a timed-out state in which the piston is not pressurized, the indicator moving from the retracted state to the extended state by contact of the piston with the indicator.

13. The time-out indicator assembly in accordance with claim 12 wherein the indicator has a visually identifiable marking thereon to distinguish between the indicator indicates the in-cycle state and when the indicator indicates the cycle timed-out state.

14. The time-out indicator in accordance with claim 13 wherein the visually identifiable marking is paint in a visibly different color below a predetermined level on the indicator to indicate the cycle timed-out state.

15. A strapping tool of the type for tensioning a strap around a load, adhering the strap onto itself, and cutting a feed end of the strap, the strapping tool comprising:
- a cylinder housing;
- a piston disposed within a cylinder in the cylinder housing;
- a pneumatic weld motor operably connected to the piston;
- a vibrating weld element operably connected to the piston for contacting the strap and adhering the strap onto itself,
- a pneumatic module mounted to the cylinder housing, the pneumatic module including a compressed gas inlet, a plurality of valves and passageways between the inlet and the valves to provide compressed gas to the cylinder housing and the pneumatic weld motor, the module further including at least one timer for operation of the weld motor and for providing pressure to the cylinder, the pneumatic module includes means for controlling timing of the weld motor; and
- a time-out indicator assembly, the time-out indicator assembly including a sleeve fitted into an opening in the module, the opening disposed above and in communication with the cylinder, the sleeve defining a central, longitudinal opening and an indicator biasedly mounted in the sleeve and disposed for contact with the piston, the indicator including a stem the indicator reciprocating between a retracted position and an extended position and indicating a cycle of the strapping tool as an in-cycle state in which the cylinder is under pressure, pressurizing the piston to urge the weld element into contact with the strap and timed-out state in which the piston is not pressurized, the indicator being in the retracted position when the strapper is in the in-cycle state and being in the extended position, by contact of the piston with the indicator, when the strapper is in the timed-out state.

16. The strapping tool in accordance with claim 15 wherein the indicator assembly has a visually identifiable marking thereon to distinguish between when the indicator indicates the in-cycle state and when the indicator indicates the cycle timed-out state.

17. The strapping tool in accordance with claim 16 wherein the visually identifiable marking is paint in a visibly different color below a predetermined level on the indicator to indicate the cycle timed-out state.

18. The strapping tool in accordance with claim 15 including a seal element disposed along the indicator stem for preventing the introduction or loss of compressed gas from the pneumatic module.

19. The strapping tool in accordance with claim 18 wherein the seal is positioned in a seal channel defined by inner and outer ring walls each having a diameter that is greater than a diameter of the indicator stem.

20. The strapping tool in accordance with claim 19 wherein the sleeve includes an inwardly projecting lip at an upper end thereof and wherein the outer ring wall engages the inwardly projecting lip to retain the indicator in the sleeve, and wherein the sleeve includes a groove in an inner wall thereof configured for receiving a retaining clip that engages the inner ring wall to retain the indicator in the sleeve.

* * * * *

UNITED STATES PATENT AND TRADEMARK OFFICE
CERTIFICATE OF CORRECTION

PATENT NO. : 6,732,638 B1 Page 1 of 1
DATED : May 11, 2004
INVENTOR(S) : Rometty et al.

It is certified that error appears in the above-identified patent and that said Letters Patent is hereby corrected as shown below:

<u>Column 8,</u>
Lines 49-54, please correct claim 6 to reads as follows:
-- The time-out indicator assembly in accordance with claim 1 wherein the sleeve includes an inwardly projecting lip at an upper end thereof and wherein the stem includes an outwardly projecting wall adapted to contact an inner wall of the inwardly projecting lip to retain the indicator within the sleeve. --

Signed and Sealed this

Thirteenth Day of July, 2004

JON W. DUDAS
*Acting Director of the United States Patent and Trademark Office*